United States Patent Office 3,407,484
Patented Oct. 29, 1968

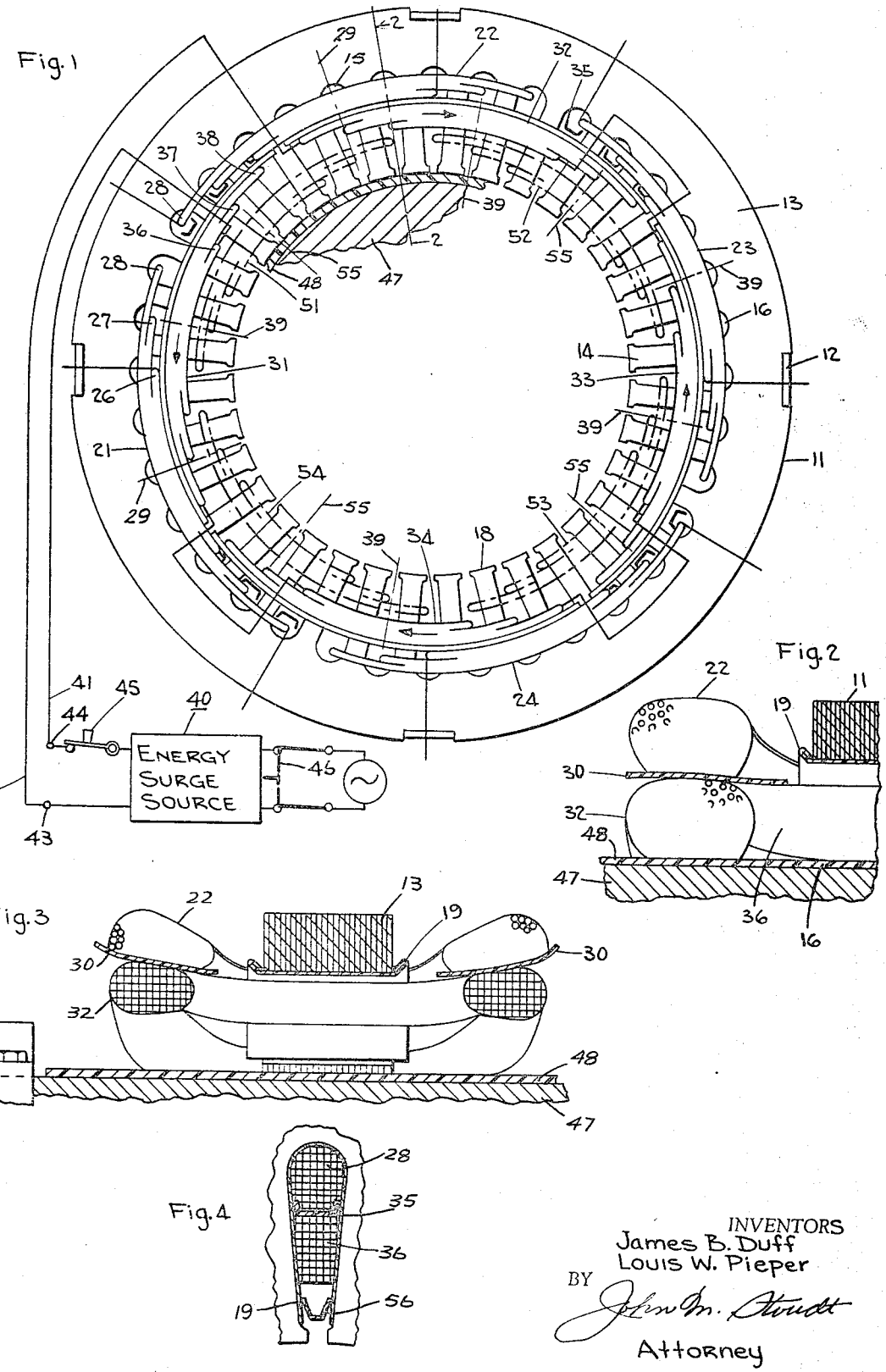

1

3,407,484
METHOD OF FORCING BACK ELECTRICAL COILS CARRIED BY SLOTTED STRUCTURE
James B. Duff and Louis W. Pieper, Fort Wayne, Ind., assignors to General Electric Company, a corporation of New York
Filed July 28, 1966, Ser. No. 568,671
7 Claims. (Cl. 29—596)

Background of the invention

This invention relates to a method for forcing back electrical coils carried by a slotted structure and in particular to an improved method of forcing back electrical coils carried by magnetic cores of inductive devices having overlapping coil portions.

Certain inductive devices, for example dynamoelectric machine stators, incorporate ferro-magnetic cores which have slots carrying or accommodating side portions of the coils, with the coil end turn portions extending beyond each end face of the cores. By way of further illustration, in one type of stator, such as that adapted for use in a polyphase motor, a number of coil groups of the same phase are carried by the core in the bottom of the slots, disposed away from the stator bore, and coil groups of second and third phases are located radially inward of the first phase, all coil groups being displaced apart in the slots 60 electrical degrees. The end turn portions of adjacent coil groups for different phases customarily overlap one another, and during fabrication of the stator, it is necessary to force back the end turn portions and in some cases the side portions of the individual coils away from the bore for a number of well known reasons.

It is extremely desirable to utilize electrical energy rather than mechanical pressing equipment, which makes physical contact with the outer surfaces of the coils, to accomplish the desired force back and compaction of at least some of the coils that are adjacent the bottom of the slot so that there is sufficient space, both at the ends of the core and in the slots, to receive additional coils. It is further desirable from a standpoint of economy and time, especially where coils of different phases are employed on the core overlapping one another, that at least two sets of coils be pressed back together in spite of their overlapping relationship. Moreover, the foregoing coil force back of the side portions and the end turn portions should be achieved by an economical and efficient method suitable for use in the mass production manufacture of inductive devices, which can use equipment already in existence.

Brief summary

Accordingly, it is an object of the invention to provide an improved method of forcing back electrical overlapping coil portions carried by a slotted structure, and more specifically, to provide an improved method especially suitable for use in forcing back and compacting end turn portions as well as coil side portions carried by a magnetic core in the manufacture of inductive device.

It is a further object of the present invention to provide an improved method of forcing or pressing back a number of electrical coils normally displaced in phase from one another carried by a stator core which achieves the desirable features mentioned above.

In carrying out the objects in one form, we provide a method of forcing back and compacting overlapping electrical coils from one position on the core to another. With specific reference to the stator of the exemplification, a first plurality of coils, such as coil group phases, are disposed in the slots, with a second plurality of coils disposed in the slots at angularly distinct locations such that the two pluralities have radially and angularly overlapping end turn portions. In addition, the two pluralities have at least some side turn portions sharing the same slots.

At least one surge of electrical energy is generated in the coil plurality which is disposed radially inward from the other plurality. The surge establishes electromagnetic forces which act on the one coil plurality thereby moving it in a general direction of the other plurality. This action rapidly compacts and forces back the one plurality of coils wherein the surge is generated, both in the side turn and end turn portions. Further, movement of the one plurality causes impact of that plurality with the radially outer plurality, producing mechanical compaction and force back of the other plurality, both in the end turn portions as well as in the side turn portions. If desired, phase insulation may be provided between the two coil pluralities in order to serve as electrical insulation when the stator has been finally fabricated and placed into operation, and to minimize relative movement and any possible injury to insulation covering the turns of the individual coils during the force-back operation.

It will be seen that this method obtains the desired compaction and force back of the turns in an efficient and rapid manner even though only some of the coils have been subjected to electromagnetic forces. In addition, it furnishes sufficient space adjacent the inner coil plurality for receiving a third plurality of coils, highly desirable, if not essential, when the inductive member is a stator for use in polyphase motors incorporating three winding phases. Further, the method is simple to practice in spite of the overlapping relation of the coils and the resulting normally complex flux and current paths through the inductive device.

The subject matter which we regard as our invention is particularly pointed out and distinctly claimed in the concluding portion of this specification. Our invention, itself, however, both as to its organization and method of operation, together with further objects and advantages thereof, may be best understood by reference to the following description taken in connection with the accompanying drawing.

Brief description of the drawing

FIGURE 1 is an end view, partially in schematic form, of a stator adapted for use in a four-pole polyphase electric motor at the stage of fabrication in which the coil groups of two phases have already been assembled in the slots of the core at angularly and radially displaced locations, with the radially inward coil groups being connected to a suitable energy surge source capable of supplying a surge of electrical energy to the selected groups;

FIGURE 2 is a view taken along line 2—2 of FIGURE 1 to show the position of the overlapping end turn portions of the two phases before they have been forced back away from the bore;

FIGURE 3 is a view similar to FIGURE 2 except that it shows the entire cross-sectional view of the core and coils along line 2—2 in FIGURE 1 revealing the relative positions of the coils and core after the end turn portions and side turn portions of the coils have been forced back to the desired locations; and FIGURE 4 is a view of one of the slots containing coil side portions of both the coil groups seen in FIGURE 1, showing the forced-back position of the individual turns in that slot, which is representative of the other slots having more than one coil side portion therein.

*Description of the preferred embodiment*

Turning now to the description of the drawing in more detail, the preferred embodiment has been illustrated in connection with the manufacture of a stator member adapted for use in a four-pole polyphase or three-phase induction type electric motor (not shown), either Y or Δ connected. The core 11 for the stator is conventionally constructed from a stack of identical ferro-magnetic laminations secured together in stacked relation by four angularly spaced apart standard slot and key structures 12 which extend axially across the outer periphery of the core. Radially inward of a yoke section 13 are a plurality of angularly spaced apart teeth sections 14 which define a number of slots 16 between adjacent teeth sections, the teeth sections terminating in enlarged lip portions 17 to provide a central rotor receiving bore 18. Each of the slots are, in turn, provided with suitable electrical insulation, such as a standard slot liner 19 composed of polyethylene terephthalate sheet material.

During manufacture of the stator, a number of coil group pluralities 21, 22, 23, and 24 have side turn portions disposed in the slots at preselected angular positions on the core and are placed into the slots after liner 19 has been installed. Any convenient way may be used to dispose the coils into the slots, such as hand placing techniques or winding equipment. Each of the coil groups 21–24 are composed of three concentrically arranged coils 26, 27, 28 formed of a preselected number of enameled turns of wire, the groups having radial polar centers 29 disposed 180 electrical degrees apart, one from the other. In the exemplification, the stator core includes thirty-six slots, the coils in each group spanning 4, 6, and 8 teeth respectively. The outermost coils 28 for each group are thus in adjacent slots and width the radial centers 29 of the coil groups being located centrally of one of the slots 15. Although in the exemplification of the coil groups at the same general radial location on the core are all in the same winding phase, they could, of course, be groups composed of different phases, if desired.

Once coil groups 21–24 inclusive have been arranged on the core, a plurality of standard end turn insulators 30, such as four polyethylene terephthalate sheet material, are assembled beneath the coil end turns to form in effect an annulus of insulation on each side of the core. In each of the slots adapted to carry coil groups 31–34 inclusive of a second winding phase is provided a generally U-shaped side turn portion insulator member 35.

Thereafter, coil groups 31–34 are installed 60 electrical degrees from the coil groups of the first winding phase, with their polar centers being indicated at 39 in FIGURE 1. Each of these latter coil groups also includes three concentric coils 36, 37, 38 which span 4, 6, and 8 teeth respectively, adjacent groups being arranged on the core for opposite instantaneous polarity without interpole connections being required. Thus, the end turn portions of the coil groups in the second winding phase are radially inward of the corresponding end turn portions of the first phase at angularly displaced positions shown in FIGURE 1. In addition, the end turn portions assume the relative positions shown in FIGURE 2 where they are somewhat loosely distributed having a tendency to depend toward the bore of the core. It should also be noted at this time that after the coil groups of the second phase have been installed on the core, side portions of one side of coils 36, 37, 38 share the same slots with coil side portions on one side of coil groups 26, 27, 28.

In order to force back and compact the coil groups so far assembled on the core, the coils of the radially inward coil group 31–34 inclusive are coupled or linked to a suitable pulsing circuit or energy surge source 40, and an electrical energy surge of preselected magnitude is generated in these coils while the coils in coil groups 21–24 inclusive are left in open circuit. The surge generated in the radially inward coils produces current flow therein and creates a transient magnetic field. Electromagnetic forces are produced which act upon the coils of groups 31–34 to impel them or force them back in a direction away from the bore 18 toward the yoke section 13 and into impacting engagement with the individual coils of the open-circuited coil groups 21–24 inclusive.

The electromagnetic forces act on the coil turns of groups 31–34 to compact the coils into a compact bundle, both in the side turn and end turn portions. The impact of the radially inner coils with the coils of groups 21–24, as the inner coils are being driven away from the bore, physically forces the radially outer coils away from the bore as depicted by FIGURE 3. Moreover, due to the overlapping relation of the end turn portions previously outlined, the radially inner coil end turn portions will force the individual turns of the outer coils away from the bore, tending to compact the side turn portions of the outer coils even where they do not share slots with the inner coils. However, a higher degree of compaction will be obtained in those slots having side turn portions shared by both coil groups, e.g., one side of coils 28, 36; 27, 37; and 26, 38. FIGURE 4 is representative of the side turn portions accommodated in a shared slot.

In carrying out this aspect of the method, any suitable equipment may be employed, such as that disclosed in the R. G. Rushing and Linkous applications Serial Nos. 414,826 and 414,825 both filed November 30, 1964, now respectively U.S. Patent Nos. 3,333,328 and 3,333,330. In the present exemplification, coil terminations 41, 42 of coil groups 31–34 are connected across terminal connectors 43, 44 of energy surge source 40 through a push-button switch 45 connected in circuit to the energy source for initiating actuation of the source which, in turn, is in circuit with an alternating current power source through switch 46. In the exemplification, closing of switch 45 actuates a circuit for charging a capacitor bank (not shown) to a selected voltage level which is regulated by a variable autotransformer (not shown). Thereafter, the capacitor bank is discharged and a surge of electrical energy, as controlled by the voltage level on the capacitor bank, is applied to the serially connected coil groups 31–34 across output terminal connectors 43, 44.

During the application of the surge, which is of sufficient magnitude to do the desired force back yet below that which will deleteriously affect the coil insulation, the stator may be supported on a cylinder 47 of non-magnetic, electrically conductive material such as copper or aluminum projecting entirely through the bore of the core. A tubular insulator 48, formed of suitable material such as compressed fiber, is arranged over cylinder 47 next to teeth portions 16 and the innermost turns of coil groups 31–34. This insulator retains the coil side portions in the slots and the end turn portions temporarily out of the bore as shown in FIGURE 2 until the coils have been forced back away from the bore. In addition, as an energy surge is being generated through the radially inner coils, eddy currents will be created near the surface of cylinder 47 to intensify the forces acting upon the adjacent wires in the manner outlined more fully in the Rushing application.

It will be seen from FIGURES 3 and 4 that after the above force back and compaction have been achieved, the coil turns in the slots will be compacted toward the bottom of the slots while the end turn portions are radially nearer yoke section 13. By virtue of the electromagnetic forces which act on coil groups 31–34, the side and end turn portions will have few, if any, cross-over wires and will assume a slightly more compact bundle than the portions for radially outer coil groups 21-24 which have been mechanically compacted by the action of the radially inner coils of groups 31-34. As revealed in FIGURE 3, there is more than sufficient space, both in the slots and next to the end faces of the core, for accommodating additional coils, such as coil groups 51, 52, 53, 54 of a third phase, shown in phantom in FIGURE 1 which have polar centers 55 displaced sixty electrical degrees from the coils already in the slots. It will be appreciated that before coil groups 51-54 have been placed in the slots, appropriate U-shaped side portion insulators and end turn separators (not shown) may be installed as already explained in connection with coil groups 31-34 and slot wedges 56 inserted into the slots next to the bore. This insertion is easily accomplished in view of the compaction of the side turn portions and space available beneath the portions (see FIGURE 4).

The third group of coils, if desired, may also be forced back in the slots and next to the end faces by generating an electrical energy surge through them in the way heretofore explained in regard to coil groups 31-34 while the radially outer coils are maintained in open circuit. Thus, additional compaction and force back, although mechanical in nature, may be obtained of coil groups 21-24 and 31-34 inclusive.

For the purpose of more clearly illustrating how the method as described above has been satisfactorily carried forth in actual practice, we will set out below a specific example without intending to limit the invention to that example. In particular, a number of cores were constructed with the configuration illustrated in FIGURE 1 having the following nominal dimensions: bore diameter, 3.125 inches; outer diameter, 5.477 inches; stack height about one inch; and slot depth, 0.7 inch. The coils were formed of enameled copper wire, 0.0239 inch diameter, coated with polyvinyl formal type resin. Each coil for the various coil groups included sixty-three turns. The stators were of the type normally used in a horsepower, three-phase induction electric motor rated at 220/440 volts, 2.0/1.0 amperes, 60/50 cycles per second.

The pulsing circuit or energy surge source for supplying the energy surge incorporated a capacitor bank nominally rated at 630 microfarads (610 actual). In one application, the bank was charged to a voltage level of 1,000 volts and a surge of approximately 305 joules discharged into serially connected coil groups 31, 32, 33, and 34 to move them away from the slot entrances and exposed slot walls. Thereafter, the capacitor bank was charged to a voltage level of 3,000 volts and a second surge of 915 joules injected into the same coils. These surges transferred both pluralities of coil groups from that shown in FIGURE 2 to that of FIGURES 3 and 4, allowing more than sufficient space for accommodating the third plurality of coil groups which were subsequently installed and also forced back. A 2,000 volt high potential test in accordance with NEMA standard MG 1-12.03, and a 3,000 volt repetitive surge test similar to NEMA standard MG 1-12.05 were applied to all the coil groups, with completely satisfactory results.

It will be seen from the foregoing that even though in the exemplification the individual coils in the three coil group pluralities under normal operating conditions produce a complex current flow and flux paths and have overlapping turn portions, by one form of our invention, they may be efficiently forced back employing the highly desirable electrical energy approach which, in turn, permits use of presently available equipment. In addition, forceback and compaction are achieved in the various coil groups at very little expense by an expeditious and efficient procedure which subjects only some of the coils to at least one energy surge and the resulting electromagnetic forces. It will also be appreciated that although the principles of our invention were illustrated in connection with polyphase stators, the invention can be advantageously employed for force-back operations in other electromagnetic devices where it is necessary to transfer a number of radially displaced coils relative to slotted coil accommodating members.

While we have shown and described certain features in connection with one embodiment of our invention, it will be obvious to those skilled in the art that changes and modifications may be made without departing from the invention. It is therefore intended in the appended claims to cover all such equivalent variations that fall within the true spirit and scope of our invention.

What we claim as new and desire to secure by Letters Patent of the United States is:

1. A method of forcing back a number of electrical coil means formed by a plurality of conductor turns, with the coil means having side portions carried in slots of a magnetic core and end turn portions extending beyond the respective end faces of the core; the method comprising the steps of: disposing side portions of at least first and second coil means in slots of the core at adjacent locations of the core; generating at least one surge of electrical energy in said second coil means and establishing forces acting upon that coil means to move it in the general direction of said first coil means; and forcing back said first coil means to another location relative to the core by the movement of the second coil means produced by the electrical surge generated therein and the impact of said second coil means with said first coil means.

2. The method of claim 1 in which the end turn portions of the first and second coil means are in over-lapping relation and during the force back of said first coil means, the end turn portions of the second coil means are being forced back and compacted.

3. The method of claim 1 in which the side portions of at least the second coil means are being forced back and compacted in the slots as the end turn portions are being forced back.

4. The method of claim 1 in which the core is a stator core having a central bore, said first and second coil means each include at least two coil groups with the coil groups of the first coil means having radial centers at angularly different locations on the core and having overlapping end turn portions with respect to the second coil means; and during the forcing back step, the coil groups of the first coil means are in open circuit.

5. The method of claim 1 in which electrical insulation is positioned between the end turn portions of the first and second coil means after the first coil means has been disposed in the core slots but before the second coil means is disposed in the slots whereby the insulation assists in protecting the first coil means end turn portions from damage as the end turn portions are being forced back.

6. The method of claim 4 in which after the coil groups of the first and second coil means have been forced back, a third coil means comprising at least two coil groups is arranged in the core slots, with the radial centers of the coil groups being at angularly different locations from the radial centers of the coil groups of said first and second coil means.

7. A method of forcing back a number of electrical coils formed by a plurality of conductor turns, with the coils having side portions carried in slots of a slotted structure and end turn portions extending beyond the slots of the structure; the method comprising the steps of: disposing at least first and second coil means in the slots in proximity to one another; forcing back at least the end turn portions of the first coil means by generating at least one surge of electrical energy in said second coil means to create electromagnetic forces which act upon said second coil means to drive the end turn portions thereof into engagement with the end turn portions of said first coil means thereby forcing back at least the end turn portions of said first coil means to another location as the end turn portions of said second coil means are also being moved to another location by the electromagnetic forces.

References Cited

UNITED STATES PATENTS

| | | | |
|---|---|---|---|
| 3,333,327 | 8/1967 | Larsen | 29—596 |
| 3,333,328 | 8/1967 | Rushing | 29—596 |
| 3,333,329 | 8/1967 | Linkous | 29—596 |
| 3,333,330 | 8/1967 | Linkous | 29—596 |
| 3,333,335 | 8/1967 | Sims | 29—596 X |
| 3,348,183 | 10/1967 | Hodges et al. | |
| 3,353,251 | 11/1967 | Linkous | 29—205 |

JOHN F. CAMPBELL, *Primary Examiner.*

J. L. CLINE, *Assistant Examiner.*